United States Patent [19]

Wiedermann et al.

[11] Patent Number: 5,223,549
[45] Date of Patent: Jun. 29, 1993

[54] PROCESS FOR THE PRODUCTION OF RIGID POLYURETHANE FOAMS

[75] Inventors: Rolf Wiedermann, Odenthal/Voiswinkel; Gerhard Heilig, Bergisch Gladbach; Wolfgang Schmitz, Odenthal-Blecher, all of Fed. Rep. of Germany

[73] Assignee: Bayer Aktiengesellschaft, Leverkusen Bayerwerk, Fed. Rep. of Germany

[21] Appl. No.: 744,210

[22] Filed: Aug. 13, 1991

[30] Foreign Application Priority Data

Aug. 24, 1990 [DE] Fed. Rep. of Germany ....... 4026702

[51] Int. Cl.$^5$ .............................................. C08G 18/34
[52] U.S. Cl. .................................. 521/107; 521/131; 521/173; 521/906
[58] Field of Search ................ 521/107, 131, 173, 906

[56] References Cited

U.S. PATENT DOCUMENTS

| | | | |
|---|---|---|---|
| 4,263,408 | 4/1981 | Meyborg et al. | 521/51 |
| 4,575,520 | 3/1986 | Kapps et al. | 521/107 |
| 4,849,459 | 7/1989 | Grace et al. | 521/110 |
| 4,940,632 | 7/1990 | Nicola et al. | 428/318.4 |

FOREIGN PATENT DOCUMENTS 239891 10/1987 European Pat. Off. .
308733 3/1989 European Pat. Off. .
2177405 5/1986 United Kingdom .

*Primary Examiner*—John Kight, III
*Assistant Examiner*—Rachel Johnson
*Attorney, Agent, or Firm*—Joseph C. Gil; Lyndanne M. Whalen

[57]   ABSTRACT

Rigid polyurethane foams are produced by reacting a polyisocyanate with a polyester containing at least two isocyanate-reactive hydrogen atoms and having a molecular weight of 400 to 10,000 in the presence of water, an organic blowing agent, a flameproofing agent and a compound containing at least two isocyanate-reactive hydrogen atoms and having a molecular weight in the range from 32 to 399 as crosslinking agent, optionally in the presence of known auxiliaries and additives. The polyester, the flameproofing agent and the crosslinking agent are used in quantities such that from about 15 to about 35 parts by weight of polyester, from about 50 to about 80 parts by weight flameproofing agent and from about 5 to about 15 parts by weight of crosslinking agent (with the sum of the parts by weight of these components adding up to 100) are present. These foams are useful as insulating materials in applications where flame resistance is important.

7 Claims, No Drawings

PROCESS FOR THE PRODUCTION OF RIGID POLYURETHANE FOAMS

BACKGROUND OF THE INVENTION

This invention relates to a process for the production of flame resistant CFC-free (i.e., chlorofluorocarbon-free) rigid polyurethane foams.

The replacement of chlorofluorocarbon (hereinafter "CFC") blowing agents in rigid polyurethane foams with other blowing agents such as $CO_2$, is problematical because the density of the foam has to be increased to obtain dimensional stability and the burning behavior of the foam is generally impaired.

The use of hydrocarbons, for example pentane, as blowing agents enables foams having "normal" densities of around 30 kg/m³ to be produced. However, these hydrocarbons have a significant adverse effect on the burning behavior of the foam. In order to improve the flame resistance of rigid foams of this type, inclusion of various solid flameproofing agents in the foam forming mixture has been proposed. See, for example GB-A 2,177,405, GB-A 2,177,406 or EP-A 239 891. However, these solid flameproofing agents have significant disadvantages. They are difficult to dose in continuous production processes carried out under high pressure. They also cause embrittlement of the rigid foams.

SUMMARY OF THE INVENTION

It is an object of the present invention to provide a foam formulation which does not include a chlorofluorocarbon blowing agent but which does produce a flame resistant rigid polyurethane foam.

It is also an object of the present invention to provide a process for the production of rigid, flame resistant polyurethane foams in which a chlorofluorocarbon is not used as a blowing agent.

These and other objects which will be apparent to those skilled in the art are accomplished by reacting a polyisocyanate with a polyester in the presence of a flameproofing agent, a crosslinking agent, water and an organic blowing agent which is not a chlorofluorocarbon. The polyester which contains at least two isocyanate reactive hydrogen atoms and has a molecular weight of from 400 to about 10,000 is used in a quantity of from about 15 to about 35 parts. The crosslinking agent which is a compound containing at least two isocyanate reactive hydrogen atoms and having a molecular weight of from 32 to 399 is used in a quantity of from about 5 to about 15 parts by weight. The flameproofing agent is preferably a liquid at 20° C. and is used in a quantity of from about 50 to about 80 parts by weight. The total parts by weight of polyester, crosslinking agent and flameproofing agent is 100 parts by weight. Water and an organic blowing agent are also included in the reaction mixture. Hydrocarbons having from 1 to 6 carbon atoms are the preferred organic blowing agents.

The foams produced from these formulations are flame resistant, rigid polyurethane foams which satisfy the requirements of fire class B2 according to DIN 4102 or class V of the Swiss BVD test.

DETAILED DESCRIPTION OF THE PRESENT INVENTION

The present invention relates to a process for the production of rigid polyurethane foams by reaction of a polyisocyanate with a polyester containing at least two isocyanate-reactive hydrogen atoms and having a molecular weight of from 400 to about 10,000 in the presence of water and organic blowing agents, flameproofing agents and compounds containing at least two isocyanate-reactive hydrogen atoms and having a molecular weight in the range from 32 to 399 as crosslinking agents. Auxiliaries and known additives may also be included in the reaction mixture. The polyester, the flameproofing agent and the crosslinking component are used in quantities such that from about 15 to about 35 parts by weight polyester, from about 50 to about 80 parts by weight of flameproofing agent and from about 5 to about 15 parts by weight of crosslinking agent, with the total parts by weight of these components adding up to 100 are present.

$C_{1-6}$ hydrocarbons are preferably used as the organic blowing agent with pentane being preferred and isopentane being particularly preferred.

Polyisocyanates which are useful starting materials for the production of the polyurethane foams include: aliphatic, cycloaliphatic, araliphatic, aromatic and heterocyclic polyisocyanates, of the type described for example by W. Siefken in Justus Liebigs Annalen der Chemie, 562, pages 75 to 136. Examples of such polyisocyanates are those corresponding to the formula

in which
n=2-4, preferably 2, and
Q represents an aliphatic hydrocarbon radical containing from 2 to 18 (preferably 6 to 10) carbon atoms; a cycloaliphatic hydrocarbon radical containing from 4 to 15 (preferably 5 to 10) carbon atoms; an aromatic hydrocarbon radical containing from 6 to 15 (preferably 6 to 13) carbon atoms; or an araliphatic hydrocarbon radical containing from 8 to 15 (preferably 8 to 13) carbon atoms.

Specific examples of such polyisocyanates are given in German Offenlegungsschrift 28 32 253, pages 10–11.

It is generally preferred that the commercially readily obtainable polyisocyanates, for example 2,4- and 2,6-tolylene diisocyanate and mixtures of these isomers ("TDI"), polyphenyl polymethylene polyisocyanates of the type obtained by phosgenation of aniline-formaldehyde condensates ("crude MDI"), carbodiimide-, urethane-, allophanate-, isocyanurate-, urea-and biuret-modified polyisocyanates ("modified polyisocyanates") be used. Polyisocyanates which are particularly preferred are those derived from 2,4- and/or 2,6-tolylene diisocyanate and those derived from 4,4'- and/or 2,4'-diphenylmethane diisocyanate.

Polyesters which are useful in the practice of the present invention are those containing at least two isocyanate-reactive hydrogen atoms and having a molecular weight of from 400 to 10,000. Polyesters containing amino groups, thiol groups or carboxyl groups are suitable. Polyesters containing hydroxyl groups, especially those having from 2 to 8 hydroxyl groups are particularly preferred. Polyesters having a molecular weight in the range from 1,000 to 8,000 are preferred with those having molecular weights of from 2,000 to 4,000 being particularly preferred. The polyester compounds containing at least two, generally two to eight and preferably two to four hydroxyl groups useful in the present invention include those known to be useful for the production of homogeneous and cellular polyurethanes. Specific examples of these polyesters are given in German Offenlegungsschrift 28 32 253 at pages 11 through 18.

Polyethers, polycarbonates, polylactones and polyamides containing at least two hydroxyl groups and having a molecular weight in the range from 400 to 10,000 may also be included in the polyurethane foam forming mixture. When used, these materials are used in quantities of up to 50% by weight, based on the polyester.

Water and an organic blowing agent, preferably a $C_{1-6}$ hydrocarbon, most preferably pentane, are used as blowing agents. The pentane may be n-pentane or any of its isomers. Isopentane is the most preferred isomer.

Any of the known flameproofing agents may be used as the flameproofing agent in the practice of the present invention. Flameproofing agents which are liquid at 20° C. are preferred. Examples of such flameproofing agents include the tris-($\beta$-chloroalkyl)-phosphates.

The crosslinking agents suitable for use in the practice of the present invention are compounds containing at least two isocyanate-reactive hydrogen atoms and having a molecular weight in the range from 32 to 399. These compounds may contain hydroxyl groups and/or amino groups and/or thiol groups and/or carboxyl groups. Compounds containing hydroxyl groups and/or amino groups are preferred crosslinking agents. These compounds generally contain from 2 to 8 and preferably from 2 to 4 isocyanate-reactive hydrogen atoms. Specific examples of such compounds are given in German Offenlegungsschrift 28 32 253 at pages 19-20.

Known auxiliaries and additives such as emulsifiers, foam stabilizers, catalysts, reaction retarders, cell regulators, pigments, dyes, stabilizers against ageing and weathering, plasticizers, fungistatic and bacteriostatic agents and fillers may optionally be included in the foam forming mixture.

Preferred emulsifiers are those based on alkoxylated fatty acids and higher alcohols.

Suitable foam stabilizers include polyether siloxanes, particularly water-soluble siloxanes. The structure of these compounds is generally such that a copolymer of ethylene oxide and propylene oxide is attached to a polydimethyl siloxane group. Foam stabilizers such as these are described, for example, in U.S. Pat. Nos. 2,834,748, 2,917,480 and 3,629,308.

Catalysts known to be useful in the production of polyurethanes such as tertiary amines and/or organometallic compounds, may also be used in the practice of the present invention.

Reaction retarders which may be used include compounds showing an acidic reaction, such as hydrochloric acid or organic acid halides.

Suitable cell regulators include paraffins or fatty alcohols or dimethyl polysiloxanes.

Examples of useful fillers include barium sulfate, kieselguhr, carbon black or whiting.

Further examples of surface-active additives and foam stabilizers, cell regulators, reaction retarders, stabilizers, flameproofing agents, plasticizers, dyes, fillers, fungistatic and bacteriostatic agents which may optionally be used in accordance with the invention and information on the use of these additives and the way in which they work can be found in Kunststoff-Handbuch, Vol. VII, edited by Vieweg and Hochtlen, Carl-Hanser-Verlag, Munchen 1966, for example on pages 103 to 113.

In the process of the present invention, the reaction components may be reacted by any of the known single-stage, prepolymer or semiprepolymer processes. Machines which may be used to carry out the process of the present invention are disclosed, for example, in U.S. Pat. No. 2,764,565. Particulars of other processing machines which may also be used in the practice of the present invention can be found in Kunststoff-Handbuch, Vol. VII, edited by Vieweg and Hochtlen, Carl-Hanser-Verlag, Munchen 1966, for example on pages 121 to 205.

It is also possible to carry out the process of the present invention by foaming the reaction mixture in a closed mold. The reaction mixture is introduced into a mold. Suitable mold materials are metals (e.g., aluminum) or plastics (e.g., epoxy resin). The foamable reaction mixture foams in the mold and forms the molding. In-mold foaming may be carried out in such a way that the molding has a cellular structure at its surface or it may be carried out in such a way that the molding has a compact skin and a cellular core. It is possible to introduce the foamable reaction mixture into the mold in a quantity such that the foam formed just fills the mold. However, it is also possible to introduce into the mold more foamable reaction mixture than is required to fill the interior of the mold with foam. This latter technique is known as overcharging and is disclosed, for example, in U.S. Pat. Nos. 3,178,490 and 3,182,104.

In many cases, known "external release agents" such as silicone oils, are used for in-mold foaming. However, it is also possible to use so-called "internal release agents", optionally in admixture with external release agents. Suitable internal release agents are disclosed in German Offenlegungsschriften 2 121 670 and 2 307 589.

It is also possible to produce foams by slabstock foaming or by the known laminator process in accordance with the present invention.

The rigid foams obtainable in accordance with the invention are useful for applications requiring increased flame resistance for polyurethane foams, such as in the building industry. They are also useful as insulation in the automotive field (trucks and automobiles), as coating materials having increased flame resistance and as noise insulators for engine bonnets.

Having thus described our invention, the following examples are given as being illustrative thereof. All parts and percentages given in these examples are parts by weight and percentages by weight, unless otherwise indicated.

EXAMPLES

Starting products

Polyol A (Comparison)

A mixture (formulation) of the following components was prepared 100 parts by weight of a polyol mixture having an OH value of 533 and a viscosity of 3400 mPa.s at 25° C. composed of 25 parts by weight of a polyether having a hydroxyl value of 470 prepared by ethoxylation and propoxylation of o-tolylene diamine, 27 parts by weight of a polyester having a hydroxyl value of 440 prepared by propoxylation of a reaction product of pththalic acid, sorbitol and diethylene glycol, 15 parts by weight of a polyether having a hydroxyl value of 630 prepared by propoxylation of ethylenediamine, 16 parts by weight of a polyether having a hydroxyl value of 450 prepared by propoxylation of a mixture of sugar and ethylene glycol, 7 parts by weight of glycerol, and 10 parts by weight tris-(β-chloroethyl)-phosphate as flameproofing agent.

Polyol B (Invention)

A mixture (formulation) of the following components was prepared:

100 parts by weight of a polyol mixture having an OH value of 430 composed of
- 10 parts by weight of a polyester having a hydroxyl value of 380 prepared from adipic acid, phthalic anhydride, oleic acid and trimethylol propane
- 10 parts by weight of a polyester having a hydroxyl value of 460 prepared by propoxylation of a reaction product of phthalic anhydride, sorbitol and diethylene glycol
- 10 parts by weight glycerol
- 50 parts by weight of the commercially available flameproofing agent "Ixol® B 251", a product of Solvay Fluor und Derivate, Hannover
- 20 parts by weight tris-(β-chloroisopropyl)-phosphate as flameproofing agent.

Polyol C (Invention)

A mixture (formulation) of the following components was prepared:

100 parts by weight of a polyol mixture having an OH value of 436 composed of
- 20 parts by weight of a polyester having a hydroxyl value of 460 prepared by propoxylation of a reaction product of phthalic anhydride, sorbitol and diethylene glycol
- 10 parts by weight glycerol
- 50 parts by weight of the commercially available flameproofing agent "Ixol® B 251", a product of Kali-Chemie, Hannover
- 20 parts by weight tris-(β-chloroisopropyl)-phosphate as flameproofing agent.

Polyol D (Invention)

A mixture (formulation) of the following components was prepared:

100 parts by weight of a polyol mixture having an OH value of 430 composed of
- 20 parts by weight of a polyester having a hydroxyl value of 380 prepared from adipic acid, phthalic anhydride, oleic acid and trimethylol propane
- 10 parts by weight glycerol
- 50 parts by weight of the commercial flameproofing agent "Ixol® B 251", a product of Solvay Fluor und Derivate, Hannover
- 20 parts by weight tris-(β-chloroisopropyl)-phosphate as flameproofing agent.

Each of the above polyol formulations was used to produce a rigid foam in a single stage process by reacting it with the materials listed in Tables 1 and 2 in the indicated quantities.

TABLE I

| (Comparison) Formulation parts by weight, | | | |
|---|---|---|---|
| Comparison Examples | 1 | 2 | 3 |
| Polyol A | 75 | 75 | 75 |
| Ixol® B 251 | 15 | 15 | 15 |
| Tris-(β-chloropropyl)-phosphate | 10 | 10 | 10 |
| Dimethyl cyclohexylamine | 1.2 | 1.0 | 1.1 |
| Stabilizer VPAC 3279 | 1.0 | 1.0 | 1.0 |
| Water | 0.6 | 0.6 | 2.5 |
| Trichlorofluoromethane | 36 | — | — |
| n-Pentane | — | 10 | 10 |
| Polyisocyanate (crude MDI, Desmodur® 44V70) a product of Bayer AG, Leverkusen) | 130 | 130 | 162 |
| Brittleness | None | Slight | Serious |
| Adhesion of the paper surface layer after 24 hours | Very good | Good | Poor |
| Density [kg/m$^3$] | 28 | 39 | 28 |
| φFlame height in the small burner test according to DIN 4102 [mm] | 130 | Over 200 | Over 200 |
| Classification according to DIN 4102 | B 2 | B 3 | B 3 |

The results set out in Table 1 show that the use of pentane and the use of relatively large quantities of water adversely affect both foam quality and burning behavior.

The polyol formulations according to the invention were foamed in accordance with the following formulations:

TABLE 2

| | (Invention) | | | | |
|---|---|---|---|---|---|
| Examples | 1 | 2 | 3 | 4 | 5 |
| Polyol B (parts by weight) | 100 | 100 | — | — | — |
| Polyol C | — | — | 100 | — | — |
| Polyol D | — | — | — | 100 | 10 |
| Dimethyl cyclohexylamine (pbw) | 1.4 | 1.4 | 1.4 | 1.4 | 1.4 |
| Stabilizer VPAC 3279 (Bayer AG, Leverkusen) | 1.5 | 1.5 | 1.5 | 1.5 | 1.5 |
| Water | 2.0 | 2.0 | 2.0 | 2.0 | 2.0 |
| n-Pentane | 10 | 10 | 10 | 10 | 10 |
| Polyisocyanate (crude MDI, Desmodur® 44V20, Bayer AG, Leverkusen) (pbw) | 148 | — | — | 146 | — |
| Polyisocyanate (crude MDI, Desmodur® 44V70, Bayer AG, Leverkusen) (pbw) | — | 148 | 150 | — | 146 |
| Brittleness | Slight | Slight | Slight | Slight | Slight |
| Adhesion of the paper surface layer after 24 hours | Good | Good | Good | Good | Good |
| Density [kg/m$^3$] | 29 | 29.5 | 29 | 28.5 | 29 |
| φFlame height in the small burner test according to DIN 4102 [mm] | 120 | 103 | 117 | 123 | 117 |
| Classification according to DIN 4102 | B 2 | B 2 | B 2 | B 2 | B 2 |
| φFlame height in the Swiss BVD test [mm] | 130 | 113 | 117 | 127 | 127 |
| Classification in the BVD test | V | V | V | V | V |

The results set out in Table 2 show that, when foamed with n-pentane and water, all the polyol mixtures according to the invention achieve both the B2 fire classification according to DIN 4102 and a class V rating in the Swiss BUD test. The brittleness and adhesion of the surface layers may be described as good.

What is claimed is:

1. A process for the production of a rigid polyurethane foam comprising reacting
   a) a polyisocyanate with
   b) from about 15 to about 35 parts by weight (based upon the total parts of polyester, flameproofing agent and crosslinking agent) of a polyester containing at least two isocyanate-reactive hydrogen atoms and having a molecular weight of from 400 to about 10,000,
   c) from about 50 to about 80 parts by weight (based upon the total parts of polyester, flameproofing agent and crosslinking agent) of a flameproofing agent,
   d) from about 5 to about 15 parts by weight (based upon the total parts of polyester, flameproofing agent and crosslinking agent) of a crosslinking agent which is a compound containing at least two isocyanate-reactive hydrogen atoms and having a molecular weight of from 32 to 399,
   e) water and
   f) an organic blowing agent which is not a chlorofluorocarbon with the total of b), c) and d) being 100 parts.

2. The process of claim 1 in which the flameproofing agent c) is a liquid at 20° C.

3. The process of claim 1 in which the organic blowing agent f) is a $C_{1-6}$ hydrocarbon.

4. The process of claim 2 in which the organic blowing agent f) is a $C_{1-6}$ hydrocarbon.

5. The process of claim 1 in which pentane is used as the organic blowing agent f).

6. The process of claim 1 in which isopentane is used as the organic blowing agent f).

7. The product of the process of claim 1.

* * * * *